United States Patent
Moran

(10) Patent No.: US 7,921,815 B2
(45) Date of Patent: Apr. 12, 2011

(54) TETHER RESTRAINT APPARATUS AND METHOD

(75) Inventor: Timothy J. Moran, Cary, IL (US)

(73) Assignee: WalkNStake, Incorporated, Cary, IL (US)

( * ) Notice: Subject to any disclaimer, the term of this patent is extended or adjusted under 35 U.S.C. 154(b) by 99 days.

(21) Appl. No.: 12/488,208

(22) Filed: Jun. 19, 2009

(65) Prior Publication Data

US 2009/0314225 A1   Dec. 24, 2009

Related U.S. Application Data

(60) Provisional application No. 61/074,072, filed on Jun. 19, 2008.

(51) Int. Cl.
*A01K 1/04* (2006.01)

(52) U.S. Cl. ............... 119/786; 119/788; 135/118

(58) Field of Classification Search .......... 119/786, 119/787, 788; D30/154; 135/118; 452/192; 52/155, 156

See application file for complete search history.

(56) References Cited

U.S. PATENT DOCUMENTS

| | | | |
|---|---|---|---|
| 210,283 A | 11/1878 | Whither | |
| 657,263 A | 9/1900 | Bunje | |
| 871,564 A | 11/1907 | Brown | |
| 2,411,856 A * | 12/1946 | Harding | 452/192 |
| 2,564,065 A * | 8/1951 | Jaden | 248/533 |
| 3,070,068 A | 12/1962 | Chapman | |
| 4,144,843 A | 3/1979 | Schrougham | |
| 4,300,857 A * | 11/1981 | Santamaria | 405/70 |
| 4,315,387 A | 2/1982 | Lee et al. | |
| 4,800,843 A | 1/1989 | Wendling | |
| 4,825,604 A | 5/1989 | Manning | |
| 5,071,389 A | 12/1991 | Castle et al. | |
| 5,881,506 A * | 3/1999 | Chapman et al. | 52/166 |
| 5,938,521 A | 8/1999 | Jasek et al. | |
| 6,374,777 B1 | 4/2002 | Willinger | |
| 6,401,656 B1 | 6/2002 | Adkisson | |
| 6,564,515 B1 * | 5/2003 | Fontenot et al. | 52/155 |
| 6,606,829 B2 * | 8/2003 | Benincasa et al. | 52/155 |
| 6,619,307 B2 | 9/2003 | Orr | |
| 6,735,911 B1 | 5/2004 | Alexander | |
| 6,764,251 B1 * | 7/2004 | Schnur | 405/224 |
| D508,009 S | 8/2005 | Urbina, Jr. | |
| 6,983,568 B2 * | 1/2006 | Chapman et al. | 52/155 |
| 7,222,590 B2 | 5/2007 | Haddad | |
| 2002/0007775 A1 * | 1/2002 | Woyjeck | 114/294 |
| 2004/0148877 A1 | 8/2004 | Roberts | |
| 2006/0207521 A1 | 9/2006 | Klauck | |
| 2006/0214449 A1 * | 9/2006 | Klusmeier | 296/26.11 |
| 2006/0265973 A1 * | 11/2006 | Guthrie | 52/153 |
| 2007/0237577 A1 * | 10/2007 | Gelfand et al. | 404/6 |

* cited by examiner

*Primary Examiner* — Yvonne R. Abbott

(74) *Attorney, Agent, or Firm* — Vedder Price, PC

(57) ABSTRACT

A tether restraint apparatus may include two folding members, pivotally connected, a tether attachment and two stakes, wherein each folding member may have one of the two stakes pivotally connected and stowable within, and where the stakes may be pivoted outside of the folding members for deployment. The two folding members are operable to be folded together with each folding member having one of the two stakes stowed within, and are further operable to be unfolded to deploy the two stakes by pivoting each of the two stakes outwardly from within the two folding members.

18 Claims, 10 Drawing Sheets

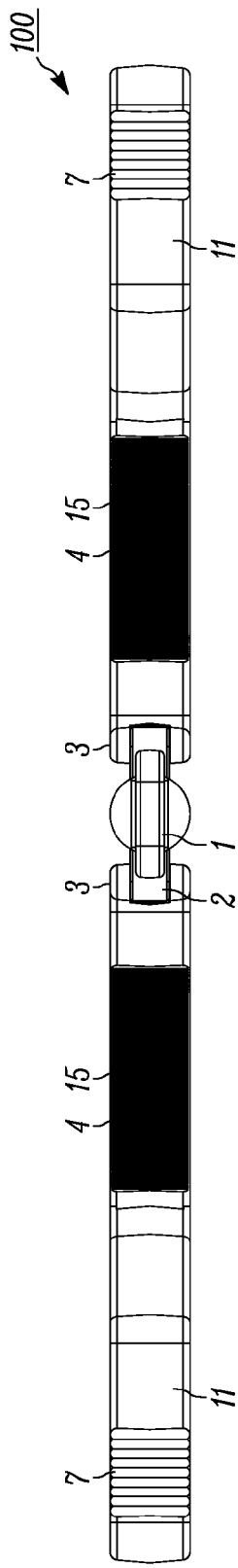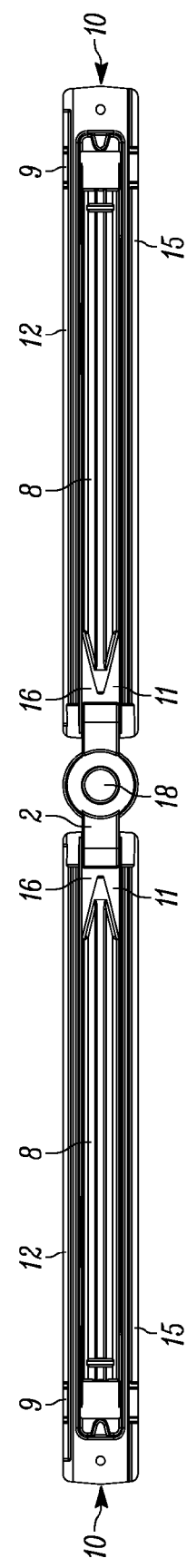
FIG. 5
FIG. 6

TETHER RESTRAINT APPARATUS AND METHOD

CROSS-REFERENCE TO RELATED APPLICATIONS

The present application claims the benefit of priority under 35 U.S.C. §119 from U.S. Provisional Patent Application No. 61/074,072 filed Jun. 19, 2008 entitled SYSTEM FOR RESTRAINING ANIMALS which is hereby incorporated herein in its entirety by reference.

FIELD OF THE DISCLOSURE

The present disclosure generally relates to systems and apparatuses for restraining a tether and more particularly to portable tether restraining systems and apparatuses including systems for animal detainment.

BACKGROUND

Tether restraining systems, where a tether, such as, but not limited to a rope, chain, wire, leash, etc., is secured to the ground, are useful in a wide variety of applications. For example, tents often require a guy wire for support, or in some cases, to prevent the tent from being blown away by wind in the case of light weight tents. Temporary communications stations often include temporary antenna masts that require support by guy wires that are attached to stakes in the ground surrounding the mast. Another common application of tether restraining systems are animal detainment systems.

Portable animal detainment systems are useful for restraining animals when and where the use of a fence or other non-portable restraint system is not practical or convenient. Portable restraint systems allow animal owners to bring their pets to places without having to worry about the safety or legal issues associated with allowing an animal to run loose. Many places have leash laws or equivalents to leash laws that require animals to be restrained in settings such as public parks and the like. Further, an unrestrained animal may run away, run into traffic, or possibly get hurt or hurt another animal or human being.

Systems of transportable animal restraint currently exist, but they have shortcomings. Existing systems include retractable leashes, large spiral leash-tether anchors, stakes, and stake and chain systems.

Retractable leashes are useful in that they can help minimize leash tangles by reducing the leash slack. Such leashes are inconvenient in that they still require a person to continuously hold the leash and to adjust the leash length if necessary. Because of the lack of a safe, easy and portable anchoring system it is impossible for someone to set an animal in the shade or away from major activity (such as a soccer game, picnic event, or campfire) without the person also being away from the activity. Also, when someone needs to hold the leash in order to restrain the animal, the animal will tend to get entangled around the person's legs or other objects nearby (such as chairs or trees). One existing retractable leash is designed to connect to a carabiner type clip (D-shaped with a spring catch on one side) on a single stake in the ground. Another retractable leash system is designed to connect to a fixed point on a single stake.

Another example of an animal restraint is a large spiral leash-tether anchor. In this type of restraint system, the animal owner has to attach and detach the leash to the leash-tether anchor, so the probability of loss of control of the animal during the fastening process is great. These devices are also cumbersome and possibly dangerous to use. In order to secure such a system to the ground (by twisting the bottom side in a corkscrew motion) a great deal of force is necessary and may require the use of tools such as a length of pipe for leverage. Precautions must be taken during transport of this device due to fact that the pointed side (that fastens to the ground) is exposed until it is attached to the ground. The same pointed side becomes dirty after use, yet remains exposed during transport without an additional cover being placed onto the device.

Simple ground stakes are sometimes used to secure a leash to the ground. Due to the exposed point (on the side that is secured to the ground), it is not safe or practical for the leash to be attached until the state is secured in the ground. This means that the probability of loss of control during attachment of the leash to the stake is higher than if the unit was safely portable while attached to the leash. Simple stakes are also cumbersome despite their slim size because of the tools necessary for fastening them to the ground. This type of device retains dirt on the pointed edge if the owner does not also bring a cover. The exposed sharp edge is also unsafe without a cover during transport.

Systems that use a stake (attached to the ground) and a chain (attached to the stake) have the same shortcomings as the stake system.

These existing systems fail to combine the benefits of portability, safety, and cleanliness in a single system.

Leashes can easily get tangled with people's legs or they can get pulled out of the user's hands, thereby freeing the animal to run away which creates dangers to the animal and potentially others in the vicinity. The existing practice of just holding onto a leash or trying to tie it to some stationary object is not safe, convenient, or stable. Sometimes, dogs are tied to strollers, chairs or bikes at athletic events or picnics. This common practice causes bikes to fall, strollers to overturn, chairs to tip, leashes to become entangled around objects possibly injuring people or the animal, and an assortment of other problems.

SUMMARY OF THE DISCLOSURE

The various embodiments disclosed herein resolve the problems of the previous systems by providing a compact and easy to use apparatus and system. The various embodiments provide portable and easy to operate tether restraint systems. The various embodiments further provide safer, cleaner, and more portable systems of animal restraint as opposed to the more cumbersome previous systems described above that are less effective, more difficult to use and less safe. The various embodiments provide a system for fastening an animal leash to a portable apparatus that can be easily held by an animal owner and can also be readily and securely fastened to the ground in order to secure the animal's leash to a fixed location. Other applications of the various embodiments will also occur to those of ordinary skill and such other applications remain within the scope of the various embodiments herein disclosed.

The present disclosure provides an apparatus that comprises two folding members, pivotally connected and having a tether attachment; and two stakes, wherein each folding member has one of said two stakes pivotally connected and stowable within, and operable to be pivoted outside of said each folding member, wherein the two folding members are operable to be folded together with each folding member having one of said two stakes within, and wherein the two folding members are further operable to be unfolded to deploy the two stakes by pivoting each of said two stakes outwardly from within said two folding members. The apparatus may further include a hinge base connected to the tether attachment and having two hinges, each hinge of the two hinges being hingedly and pivotally connected to one of the two folding members. The tether attachment may be rotatable around its axis. In embodiments having a hinge base, the tether attachment may be rotatable around the axis of its connection to the hinge base.

In the various embodiments, the two folding members may each include a recess wherein one of the stakes is pivotally connected within the recess. The two folding members may also include a closing portion such that they form a seal enclosing the two stakes when the folding members are folded together. Some embodiments may have as a closing portion, a tongue and groove connection wherein one of the two folding members includes a tongue portion and the other of the two folding members includes a groove portion. Some embodiments may also include a handle portion having a grip on one of both of the folding members.

The two stakes may be pivotally connected within the two folding members via a pin connector, where the stakes are pivotable about the pin connector, or via a screw, where the stakes are pivotable about the screw.

The two folding members may be unfolded to form an angle of approximately 180 degrees with respect to each other. The two stakes are operable to be pivoted outwardly from their respective, corresponding folding members to form an angle of approximately 90 degrees with the corresponding folding member.

Further, in some embodiments, the two folding members may be operable to be unfolded to form an angle of approximately 180 degrees with respect to each other, and further operable to be offset in elevation relative to each other by forming respective angles between a hinge base and each of the two folding members.

The present disclosure also provides a method of operating a tether restrain apparatus comprising unfolding two folding members, pivoting a first and second stake outwardly from each of the two folding members; and applying a downward pushing force upon the two folding members to push the first and second stake into the ground. The method may also include unfolding the two folding members to from an angle of approximately 180 degrees; and arranging the two folding members such that one folding member is offset in elevation with respect to the other folding member.

BRIEF DESCRIPTION OF THE DRAWINGS

FIG. 5 is a top view of the embodiment of FIG. 1 through FIG. 4 shown in an open position.

FIG. 6 is a bottom view of the embodiment of FIG. 1 through 5 shown in an open position but with the ground stakes stored within the folding members.

Figure 1:
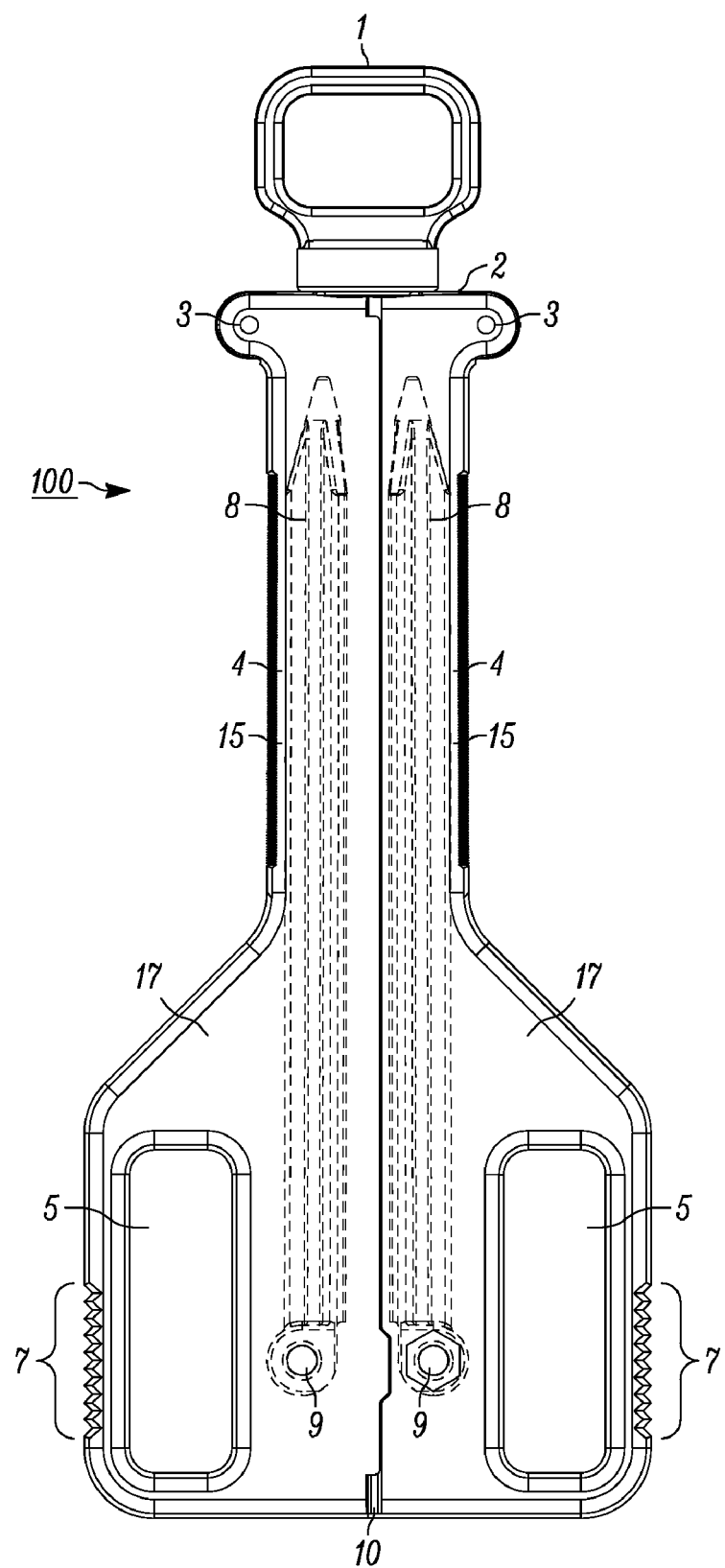
FIG. 1 is a side view of one embodiment in a folded or closed position.

The foregoing summary, as well as the following detailed description of the various embodiments, will be better understood when read in conjunction with the appended drawings. For purposes of illustration certain embodiments are shown in the drawings, however, it is to be understood, that the various inventive features illustrated in the present disclosure are not limited to the arrangements and instrumentality shown in the attached drawings but that various embodiments and equivalents may occur to those of ordinary skill and such embodiments remain within the scope of the present disclosure and the appended claims.

DETAILED DESCRIPTION

The various embodiments disclosed herein provide a portable system and apparatus for securing a tether to a fixed position. One application of an embodiment herein disclosed provides a safe and portable system for restraining anything that is typically restrained by a leash, such as a dog or other animal. Other applications include, but are not limited to, tent guy wire or wind restraining strap restraints, antenna mast guy wire restraints, or any other suitable application in which a tether, such as, but not limited to, a rope, wire, guy wire, strap, leash, etc., may be fastened to a fixed position in the ground. Various other applications may occur to those of ordinary skill based upon the disclosure of the various embodiments provided herein.

In certain embodiments, a single unit design is disclosed to which a leash may be attached. Some of the various embodiments may include two stakes, which may be multiple sided stakes, (for securing the system to the ground). The stakes can fold into and out of a handle when the apparatus is opened. The handle and stakes may be made out of aluminum, plastic or any other suitable alternative material. Still other embodiments may include three sided stakes, rounded stakes, or stakes having various other shapes. Additionally, multiple stakes per side may be used. This folding of the stakes allows for clean and safe storage of the stakes until needed to deploy the apparatus.

The various embodiments may have various overall sizes and incorporate folding stakes of various lengths. In one embodiment for use as a pet detainment apparatus, the overall size, when closed, may be approximately 10 inches long by 4 inches wide. Some embodiments may also include a rounded and tapered handle portion. For example, in some embodiments a tapered handle portion may be approximately 1.25 inches wide by 3.5 inches long. When opened for deployment, some embodiments may have a length of approximately 19 inches and a width of approximately 1.25 inches. The various embodiments may be fabricated using plastic, aluminum, rubber and stainless steel, or various combinations thereof. However, any suitable material may be used in accordance with the embodiments.

Turning now to the drawings wherein like numerals represent like components, FIG. 1 illustrates a side view of one exemplary embodiment 100 of an apparatus for restraining a tether in a folded or closed position. The exemplary embodiment 100 include two folding members 15, each of which stows a stake 8 within a stake recess. In FIG. 1, the stake recesses are concealed within the folding members 15. The two folding members 15 are relatively longitudinal in that their length is at least equal to, or slightly greater than, the length of the stakes 8, such that the stakes 8 may be stowed within. The two folding members 15, when folded, have the appearance of a single apparatus or unit. The two folding members 15 may include a locking mechanism 10, which may be any suitable locking mechanism, such as, but not limited to, a latch, clasp, clip or magnet, at the closing end of the folding members 15 to assist in maintaining the folding members 15 in a closed position when folded together. Thus, for example, locking mechanism 10 in FIG. 1 may be a magnetic clasp. The stakes 8 may be made of aluminum or plastic, or any other suitable material, and are held in position via a pin or screw 9. The stakes 8 may be removable and replaceable by removing the pin or screw 9, installing a new stake and reinstalling the pin or screw 9 or providing a new pin or screw 9. The exemplary embodiment 100 also includes a handle portion 17 that has a grip 5 which is of a suitable size such that a user's fingers may fit comfortably within the grip 5 so that the user may grasp onto the handle portion 17. The embodiment 100 further includes a tether attachment 1 which may be attached to a hinge base 2. The hinge base 2 includes two hinges 3 at each end of the hinge base, and is hingedly and pivotally connected to both of the folding members 15. The folding members 15 may also include a texturing material to provide a textured surface 4. The handle portion 17 may similarly have a textured surface 7, which may provide, for example, a rib like surface for enhancing the user's grip on the handle portion 17. Some embodiments may also include a wrist strap hole 6, to which a wrist strap (not shown) may be attached. The handle portion 17 or a wrist strap, enables a user to hold the apparatus when, for example, a pet's leash is attached to the tether attachment, so that the user may control the leash using the apparatus, rather than having to hold onto the leash itself.

Figure 2:
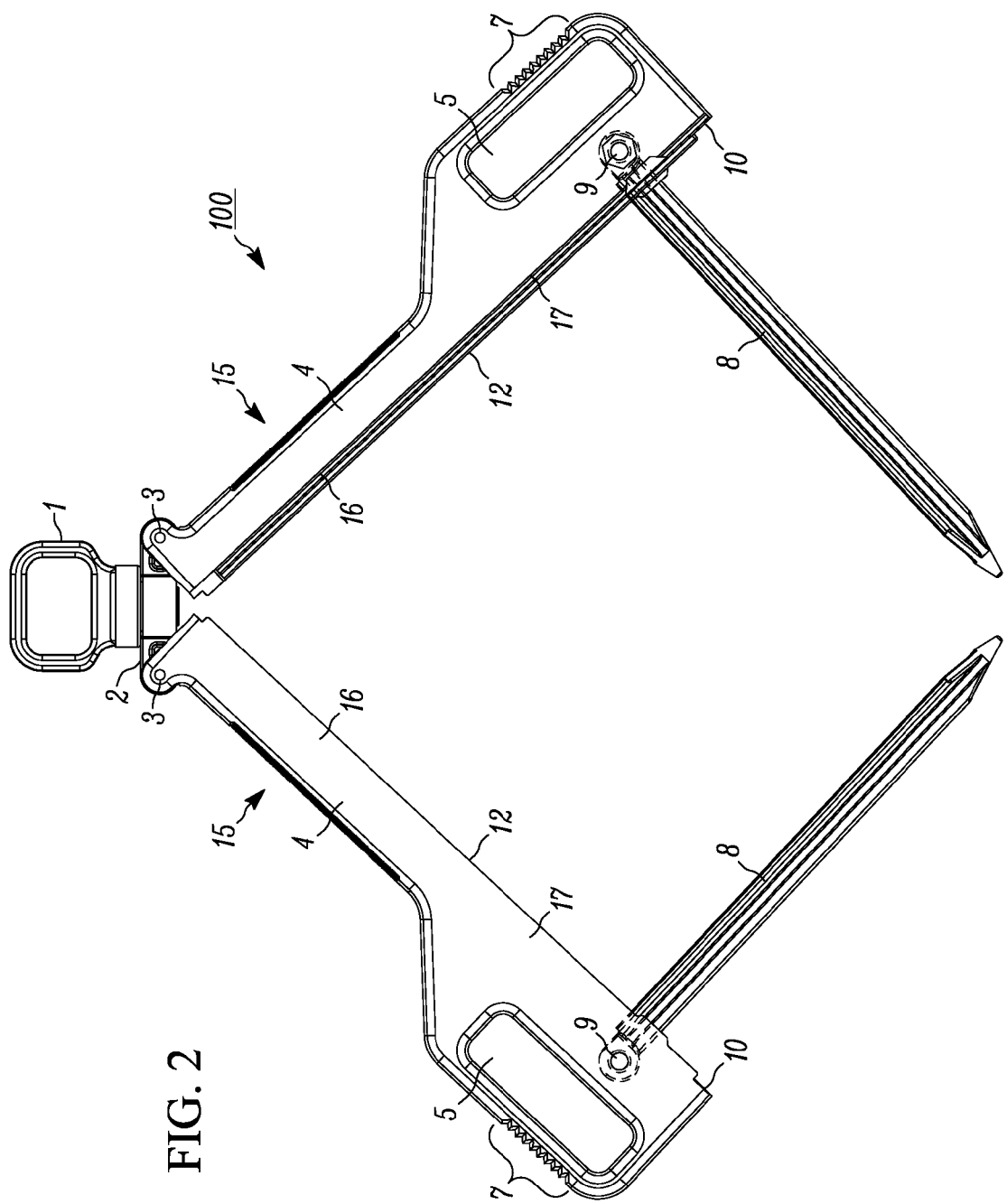
FIG. 2 is a side view of the embodiment shown in FIG. 1, in a partially opened position.

FIG. 2 illustrates a side view of the exemplary embodiment 100 in a partially opened position, wherein the folding members 15 are shown pivoted partially away from one another on the hinges 3. When the two folding members 15 are separated, the stakes 8 may also pivot outwardly from the stake recesses 16. The stakes 8 are pivotable about the two pins or screws 9. The stake recesses 16 may be any suitable size in the various embodiments. For example, the stake recesses 16 may be only slightly larger than the stakes 8 so that the stakes 8 will just fit within the stake recesses 16. However, in other embodiments, the folding members 15 may be substantially hollow, or otherwise have a channel like cross-section. Each of the stakes 8, when stowed within the stake recesses 16 of the folding members 15, will be substantially in parallel with its corresponding folding member 15 in most embodiments. However, in other embodiments, a stake 8 may form a slight angle to its corresponding folder member 15 when stowed therein. The folding members 15 may be made of high strength plastic in some embodiments. Further, in some embodiments, folding members 15 may include a closing portion 12 that provides a snug fit when the folder members 15 are in a closed position. For example, the closing portion 12 may be a tongue and groove fit. For one exemplary application wherein the embodiment 100 may be used as an animal or pet restraint, the handle portion 17 provides an animal walking handle, or leash securer, such that when the apparatus is in a closed position, and a leash is attached to the tether attachment 1, the pet owner may walk the dog by holding onto the handle portion 17 to secure the dog's leash. The pet owner can later use the apparatus as an animal restraint system when the apparatus is placed in an open position and deployed, by fastening it to the ground.

In some embodiments the two folding members 15 will be essentially equal halves of the apparatus and joined together at a point such that the two members may be rotated, or pivoted, away from each other using one or more hinges, such that the folding members 15 may be positioned at approximately 180 degrees. When the folding members 15 are opened, the two stowed stakes 8 are allowed to swing out of the stake recesses 16 on pins, or some other suitable connection, in a hinge like manner. The stakes 8 are moveable to a point that is approximately 90 degrees with respect to the folding members 15. That is, after being deployed from the stake recesses 16, the stakes are approximately perpendicular to the two connected folding members 15. After the stakes 8 are deployed, the apparatus may then be deployed by pushing the stakes 8 into the ground by human force, ideally to a point where the entire apparatus is flush with the ground. This can be accomplished by hand and/or by stepping on the flat textured portion of each handle portion 17 or of each folding member 15. For animal detainment applications, an animal's leash would be already attached to the apparatus before and after staking into the ground in order for the animal owner to exercise continuous control over the animal.

Some embodiments will provide a loop type tether attachment 1, attached to a top side of the apparatus, an that may swivel 360 degrees in any direction. The tether attachment may be positioned at the center of the apparatus, but may be at various other positions.

An animal owner may step onto each end on the folding members 15, or on the handle portions 17, to push the stakes flush with the ground if desired. The handle portions 17, which have grips 5, are useful for removing the apparatus from the ground by pulling upwardly on the handle portions 17. Some embodiments may have a wrist strap in lieu of the handle portions 17, and in such embodiments the wrist straps may be used to remove the apparatus from the ground. After removal from the ground, the apparatus may be closed with the stakes 8 folded/nestled inside of the two folding members 15, which may be held together through a locking tongue and groove type closing portion 12.

The stakes 8 may be placed apart at various distances in the various embodiments. In embodiments for detaining pets, two stakes spaced approximately 17 inches apart will provide holding strength for when the animal pulls in one direction or another. In some embodiments, the stakes 8 may also be of various lengths, and may have multiple sides to increase the surface area of the stake that is dug into the ground, which thereby increases the frictional surface in order to add to the holding power of the system. Some embodiments for pet detainment applications may employ stakes of approximately 7 or 8 inches in length.

Figure 3:
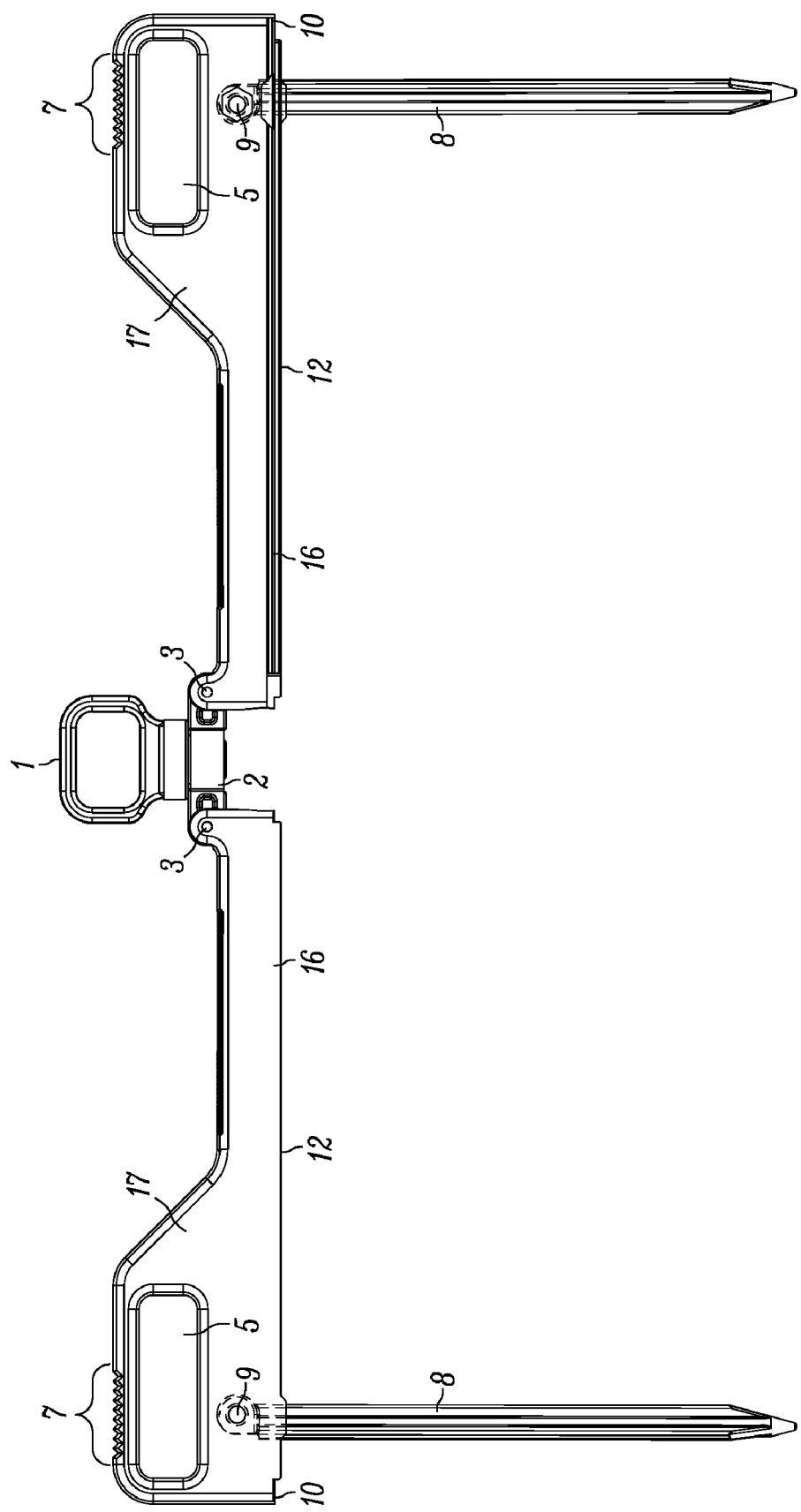
FIG. 3 is a side view of the embodiment shown in FIG. 1 and FIG. 2 in a fully opened position, such that it may be installed in the ground.

FIG. 3 illustrates a side view of the exemplary embodiment 100 in an open position such that it is ready to be deployed in a fixed position. In FIG. 3, the folding members 15 are rotated about their respective hinges 3 and are at an approximately 180° angle with respect to each other. During deployment the open apparatus as shown in FIG. 3 may be held parallel to the surface of the ground and pushed downwardly to insert the stakes. However, because of the adjustability of the hinged connections, that is, because the hinges 3 are attached at each end of the hinge base 2, the two folding members 15 may be slightly offset from each other when deployed, and/or may form an angle, smaller than 180°, when deployed in the ground. Therefore, various advantages are realized by the hinged connection employing the hinge base 2 in the various embodiments.

The stakes 8 may be oriented at approximately 90 degree angles with each stake's respective folding member 15, such that the stake 8 may be readily pushed relatively downwardly into the ground. The user may provide additional force by stepping on the apparatus so that the user's body weight provides force to push the stakes into the earth. Assistance may also be provided by the textured surfaces 4, 7 on either of, or both of, the two folding members 15 and their respective handle portions 17. The stakes 8 may be driven into the ground until the apparatus is flush with the surface of the ground.

Figure 4:
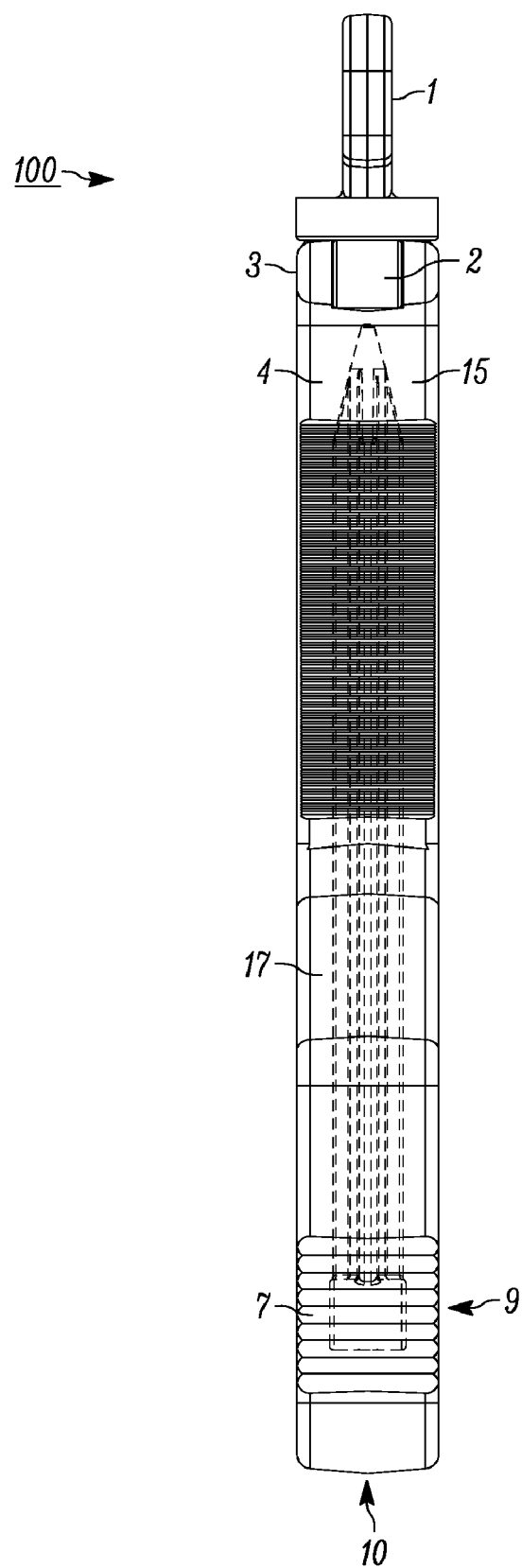
FIG. 4 is a top view of the embodiment of FIG. 1 through FIG. 3 shown in a closed position.

FIG. 4 illustrates a closed top view of the exemplary embodiment 100 wherein the stakes 8 are shown nestled inside the stake recesses 16 of the folding members 15. The stake recesses 16 allow for the sharp edges of the stakes to be safely tucked away when the apparatus is not secured to the ground. Tucking away the stakes 8 into the stake recesses 16 also keeps the dirt that the stakes may retain away from the user, his or her clothes, car upholstery or anything else that the user does not want to get dirty.

FIG. 5 illustrates an open top view of the exemplary embodiment 100. The textured surface 4 and/or textured surface 7, may be applied for increased comfort and a better grip. FIG. 5 also shows the top view of the tether attachment 1, to which, for example, a guy wire, rope, or a pet's leash may be attached. In the exemplary embodiment 100, a the tether attachment is a loop-type attachment such that the tether may be quickly and easily fastened. Further, the tether attachment 1 may be capable of swiveling 360 degrees to avoid tangling, which, in cases where the apparatus is used for pet detainment, is beneficial for avoiding pet discomfort or damage to the leash attachment. The tether attachment 1 may be made of plastic or any other suitable material for the application. For example, the tether attachment may be made of aluminum. Additionally, alternative embodiments to exemplary embodiment 100 may employ other types of tether attachments and such other tether attachments would remain in accordance with the present disclosure and the various embodiments.

FIG. 6 shows the bottom view of the exemplary embodiment in an open position, but with the stakes 8 stowed in the stake recesses 16. The bottom view also shows the bottom of the hinge base 2, to which the tether attachment may be attached in some embodiments. The hinge base 2 may be made of stainless steel, aluminum, brass, plastic or any other suitable material. FIG. 6 also illustrates the closing portion 12, which may provide a tongue and groove connection as was described above. The pins or screws 9 that secure the stakes 8 into the stake recesses 16 can also be seen as positioned to act as axes or hinges for the stakes 8 such that the stakes 8 may be rotated or pivoted about the pins or screws 9 to deploy the stakes 8. Some embodiments may also include a latch mechanism (not shown) for purposes of locking the stakes 8 in to an approximately 90 degrees angle position to assist in facilitating pushing the stakes into the ground. Such a latch mechanism may include a ratchet, a snap fit lock, or any other suitable mechanism. For example, a protruding portion of the folding member within the stake recesses 16 may catch the pivoted end of the stakes 8 to hold them in place. The protruding portion may be a plastic wall or bar such that the stakes 8 may be again snapped out of the 90 degree angle position such that the stakes 8 may be stowed in the stake recesses 16.

Figure 7:
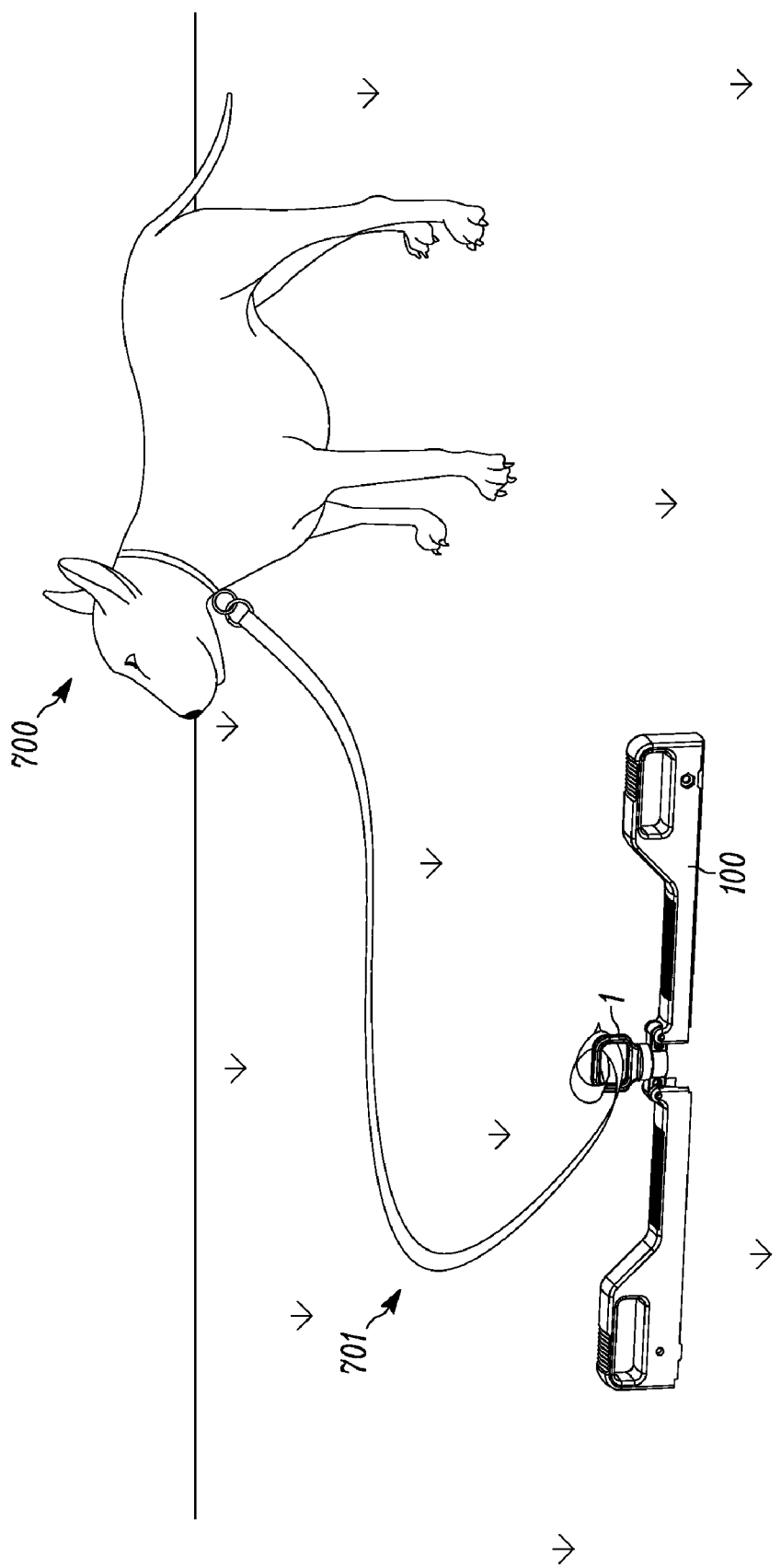
FIG. 7 illustrates an exemplary application of the embodiments where the disclosed apparatus is used for restraining an animal.

FIG. 7 illustrates one application of the exemplary embodiment 100 where the apparatus is used as a pet detainment apparatus. In FIG. 7 a happy pooch 700 (happy because he was allowed to be at the family picnic) is tethered to the apparatus 100 via his leash 701. One end of the leash 701 is attached to the tether attachment 1. As the happy pooch 700 moves around the apparatus, the tether attachment 1 rotates which is helpful in avoiding twisting or tangling of the leash 701. Although FIG. 7 illustrates one application for the various embodiments disclosed herein, it will be apparent to one of ordinary skill that various other applications exist wherein the various embodiments may be usefully employed.

Figure 8:
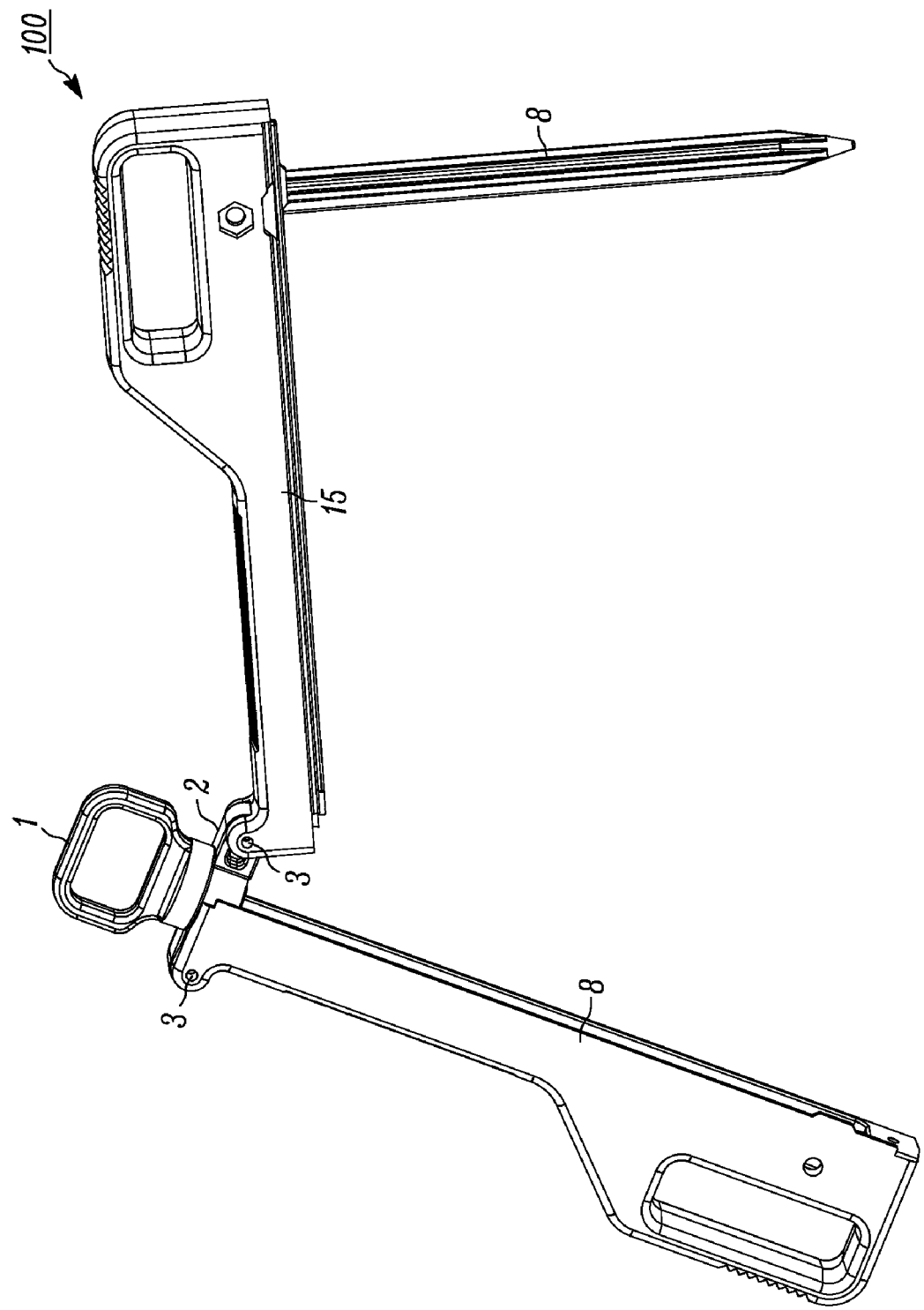
FIG. 8 shows how the hinged connection of some embodiments allows the two folding members to be slightly offset in elevation and/or at various angles to each other, in accordance with the embodiments.
Figure 9:
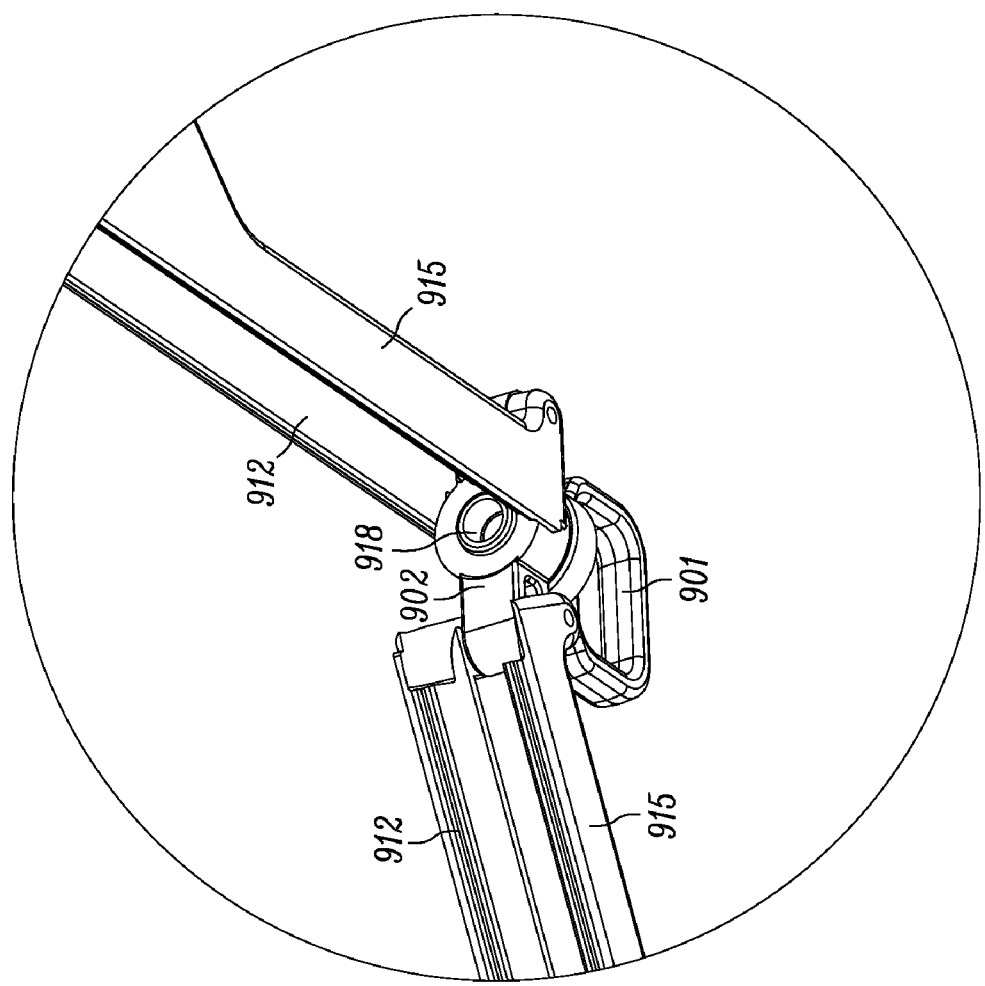
FIG. 9 provides further details of a tether attachment and hinge base in accordance with the embodiments.

FIG. 8 illustrates how the folding members 15 are pivotable about the hinges 3, and how the hinge base 2 allows the folding members to be in offset positions. The ability to position the folding members slightly offset or at slight angles is beneficial in that the ground where the apparatus is to be deployed is not always even. It is to be understood however, that alternative embodiments may not employ a hinge base 2 and the two folding members 15 may be hingedly connected to each other. The tether attachment 1 may, in such embodiments, be attached at some other suitable location on one of the folding members 15. Also, some embodiments may include more than one tether attachment, and such multiple tether attachments may be positioned at various locations on the folding members. FIG. 9 shows further details of the hinged connection in accordance with one embodiment.

In FIG. 9, the tether attachment 901 is connected to a hinge base 902 via hardware 918, which may be a screw, or, may be a rivot or pin that allows the tether attachment 901 to freely rotate. The folding members 915 as shown in FIG. 9, are channel like segments that allow the stakes to be stowed within the interior of the channel. FIG. 9 also illustrates a closing portion 912 that provides a tongue and groove seal when the folding members 915 are placed in a closed position.

Figure 10:
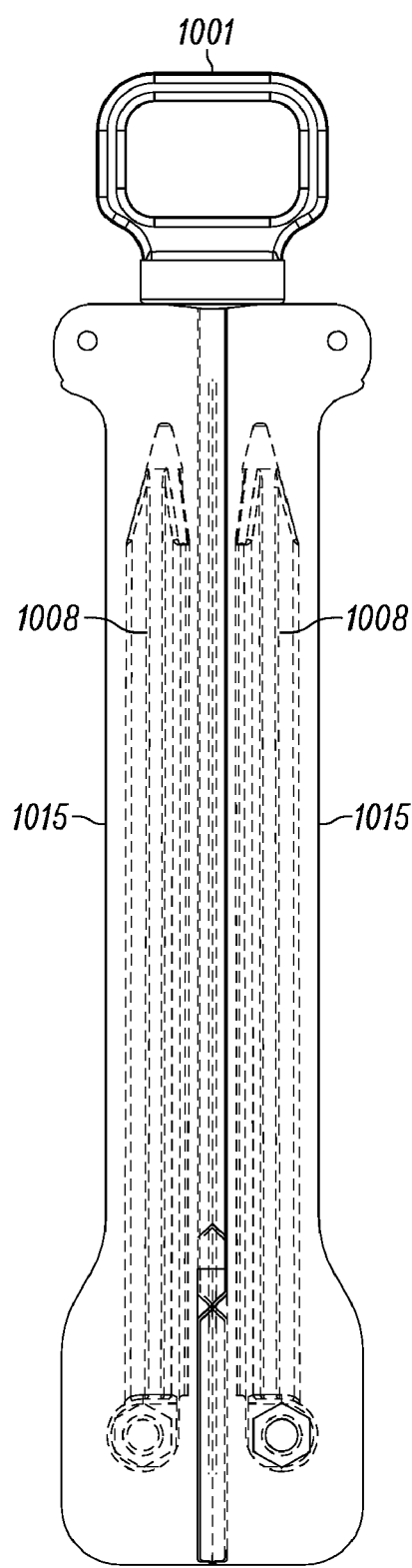
FIG. 10 illustrates a side view of an embodiment that does not have a handgrip.
Figure 11:
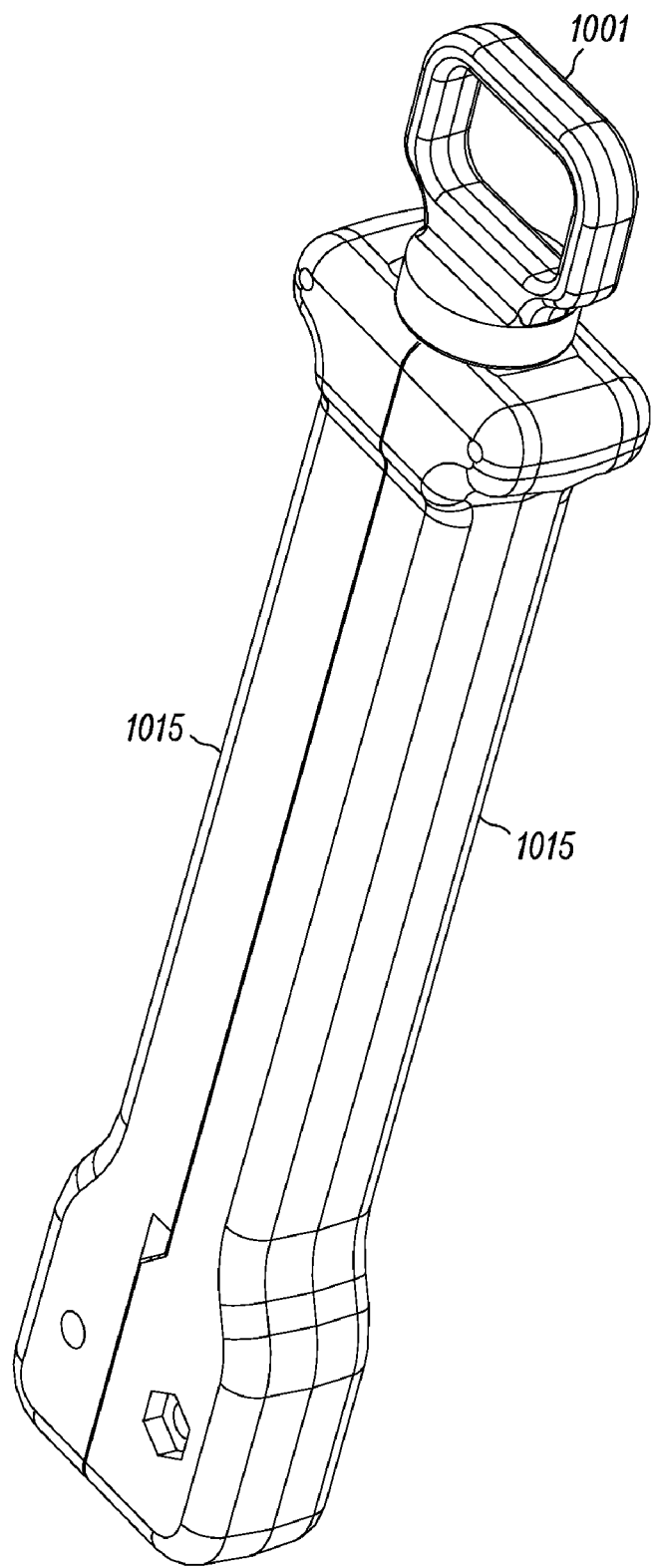
FIG. 11 is a perspective view of the embodiment shown in FIG. 10.

FIG. 10 and FIG. 11 provide a side view, and a perspective view of an embodiment that does not include handle portions such as the handle portions 17 shown in FIG. 1. The folding members 1015 still house stakes 1008 and are hingedly connected to a tether attachment 1001. The embodiment shown in FIG. 10 and FIG. 11 may include a hole near or below the stake 1009 pivot points, such that a wrist strap (not shown) may be attached. Therefore, the exemplary embodiments shown in FIG. 1 and FIG. 10 illustrate how the inventive principles may be applied to various embodiments having various external appearances with respect to the folding members, the ground stakes, the tether attachment, etc., and that such embodiments are contemplated herein and included within the scope of the present disclosure.

Therefore the various embodiments provide advantages over prior systems and apparatuses in that the various embodiments are more transportable, more practical, safer to transport (as all pointed/sharp ends are nestled inside of the closed apparatus), cleaner to handle (as soiled stakes are nestled inside of the closed apparatus), less cumbersome to use (as there is no need for additional tools such as hammers or pipes for leverage), and are self-contained. Embodiments used for pet detainment applications allow for continuous control of an animal (such as a dog) and may be used almost anywhere you would like to walk or stop to secure your animal. Other benefits over existing systems and apparatuses include an increase in the amount of exercise an animal gets because of the increased mobility the disclosed embodiments offer to pet owners who may now be more inclined to take their animals places and include them in activities knowing that they will have the freedom to secure the animal in almost any desired location easily and safely (such as camping, picnics, athletic events, exercise, training, or visiting friends and family).

While some embodiments have been described with reference to the drawing figures provided herewith, it is to be understood by those of ordinary skill in the art that various changes and modifications may be made and that various equivalents may be substituted without departing from the scope of the present disclosure and the various embodiments herein disclosed. In addition, many modifications may be made to adapt to a particular situation or a particular application, such as using various materials, etc., and that such modifications or adaptations to the teachings do not depart from the present disclosure's scope. Therefore, the various embodiments herein disclosed and described are for illustrative purposes and are not in any way to be construed as limiting the scope of the present disclosure to the particular embodiments disclosed.

What is claimed is:

1. An apparatus comprising:
   two folding members, pivotally connected and having a tether attachment; and
   two stakes, wherein each folding member has one of said two stakes pivotally connected and stowable within, and operable to be pivoted outside of said each folding member to extend in a direction opposite the tether attachment, wherein the two folding members are operable to be folded together with each folding member having one of said two stakes within, and wherein the two folding members are further operable to be unfolded to deploy the two stakes by pivoting each of said two stakes outwardly from within said two folding members to extend in a direction opposite the tether attachment.

2. The apparatus of claim 1, further comprising:
   a hinge base connected to said tether attachment and having two hinges, each hinge of said two hinges being hingedly and pivotally connected to one of said two folding members.

3. The apparatus of claim 2, wherein said tether attachment is rotatable around an axis of said tether attachment, said axis corresponding to said tether attachment's connection to said hinge base.

4. The apparatus of claim 2, wherein said two folding members are operable to be unfolded to form an angle of approximately 180 degrees with respect to each other, and further operable to be offset in elevation relative to each other by forming respective angles between said hinge base and each of said two folding members.

5. The apparatus of claim 1, wherein said tether attachment is rotatable around an axis of said tether attachment.

6. The apparatus of claim 1, wherein each of said two folding members includes a recess wherein one of said stakes is pivotally connected within said recess.

7. The apparatus of claim 1, wherein said two folding members include a closing portion wherein said two folding members form a seal enclosing said two stakes when said folding members are folded together.

8. The apparatus of claim 7, wherein said closing portion is a tongue and groove connection wherein one of said two folding members includes a tongue portion and the other of said two folding members includes a groove portion.

9. The apparatus of claim 1, wherein one of said two folding members includes a handle portion having a grip.

10. The apparatus of claim 9, wherein said handle portion includes a textured surface.

11. The apparatus of claim 1, wherein each of said two stakes is pivotally connected within one of said two folding members via a pin connector, said stake being pivotable about said pin connector.

12. The apparatus of claim 1, wherein each of said two stakes is pivotally connected within one of said two folding members via a screw, said stake being pivotable about said screw.

13. The apparatus of claim 1, wherein said two folding members are operable to be unfolded to form an angle of approximately 180 degrees with respect to each other.

14. The apparatus of claim 1, wherein each one of said two stakes are operable to be pivoted outwardly from one of said folding members to form an angle of approximately 90 degrees with said one of said folding members.

15. The apparatus of claim 1, wherein at least one of said two folding members includes a textured surface.

16. The apparatus of claim 1, wherein said two folding members include a magnetic clasp that clasps the two folding members together when the two folding members are folded together.

17. A method of operating a tether restraint apparatus, the method comprising:
    unfolding two folding members;
    pivoting a first and second stake outwardly from each of said two folding members; and
    applying a downward pushing force upon said two folding members to push said first and second stake into the ground.

18. The method of claim 17, further comprising:
    unfolding said two folding members to from an angle of approximately 180 degrees; and
    arranging said two folding members such that one folding member is offset in elevation with respect to the other folding member.

* * * * *